United States Patent
Hussain

(10) Patent No.: US 6,667,745 B1
(45) Date of Patent: Dec. 23, 2003

(54) SYSTEM AND METHOD FOR LINEARLY MAPPING A TILED IMAGE BUFFER

(75) Inventor: Zahid Hussain, San Jose, CA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/470,948

(22) Filed: Dec. 22, 1999

(51) Int. Cl.⁷ .................................................. G09G 5/36
(52) U.S. Cl. ........................ 345/545; 345/546; 345/568
(58) Field of Search ............................... 345/545, 546, 345/547, 568, 569

(56) References Cited

U.S. PATENT DOCUMENTS

| | | | |
|---|---|---|---|
| 5,247,632 A | * 9/1993 | Newman | 711/1 |
| 5,388,207 A | * 2/1995 | Chia et al. | 345/513 |
| 5,473,348 A | * 12/1995 | Fujimoto | 345/200 |
| 5,724,027 A | * 3/1998 | Shipman et al. | 340/825.31 |
| 6,226,733 B1 | * 5/2001 | Belgard | 711/213 |
| 6,240,863 B1 | * 6/2001 | Vickroy et al. | 112/475.18 |

* cited by examiner

Primary Examiner—Matthew C. Bella
Assistant Examiner—Mackly Monestime
(74) Attorney, Agent, or Firm—Woodcock Washburn LLP

(57) ABSTRACT

The present invention is a system and method that efficiently converts a linear configuration virtual memory address to a physical memory address via a tile XY coordinate configuration system. The system and method of the present invention facilitates access of tile configuration frame buffers in a physical memory by computer graphics applications that are designed to designate frame buffer addresses in a virtual linear configuration. A linear-address is converted to into a tile XY coordinate address. Then a memory stroing a descriptor table is utilized to identify a translation buffer base frame offset associated with the particular frame buffer comprising the information to be accessed. Based upon the translation buffer base frame offset, a tile offset into the actual frame buffer tile is generated. A translation buffer component maps a number of graphics tiles and determines the address of a physical memory location associated with a base pixel of a particular graphics tile. The base pixel address is then combined with the tile XY address to determine the physical memory location.

22 Claims, 8 Drawing Sheets

| Frame Buffer Identifier | Translation Buffer Base Frame Offset |
|---|---|
| 0 | 1000 |
| 1 | 31245 |
| 2 | 54378 |
| ⋮ | ⋮ |
| 62 | 47589357 |
| 63 | 27532904 |
| 64 | 57835479 |

| Frame Buffer Address | Physical Memory Address |
|---|---|
| 0 | 0 |
| 1000 | 784674 |
| 31245 | 135768 |
| 54378 | 5457838 |
| ⋮ | ⋮ |
| 27532904 | 7849382 |
| 47589357 | 9754374 |
| 57835479 | 3785792 |

510
Receive a memory write or read command configured in a linear configuration system.

520
Convert a linear address into an XY coordinate address.

530
Translate the XY address to a physical memory location address.

540
Transmit the physical memory location address to a memory comprising a frame buffer.

FIG 5

SYSTEM AND METHOD FOR LINEARLY MAPPING A TILED IMAGE BUFFER

FIELD OF THE INVENTION

The present invention relates to the field of computer memory address mapping. More particularly, the present invention relates to a device for more efficiently converting a linear configuration virtual memory address to a physical memory address via an XY coordinate configuration system.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices; video equipment, and telephone systems include computer graphics systems that have facilitated increased productivity and reduced costs in analyzing and communicating data, ideas and trends in most areas of business, science, education and entertainment. Usually, applications designed to provide these results utilize information stored in a memory of a computer system. To be effective and operate properly, most graphics applications require the information to be communicated efficiently to and from the memory via a computer graphics system.

Computer graphics'systems typically provide a method for interfacing between a computer and a user. Often, this interfacing involves the graphical representation of images (graphics) on a display screen, other visualization device or a hard copy printout. Graphics are generated by computer graphics systems that simulate and display images of real or abstract objects. Graphics enable a user to visualize and comprehend the configuration of a single object or the interaction and relationships between a group of objects. The images usually comprise pictures in which the objects remain still, or video displays in which the objects move. Most modern computer graphics systems are interactive, permitting a user to input changes to a display or modify the images on the fly.

In a complex or three dimensional (3D) computer generated graphical image, objects are typically described by graphics data models. These coverage masks typically define the shape of the object, the object's attributes, and where the object is positioned. The shape of the object is normally described in terms of "primitives", which usually comprise mathematically described circular disks, vectors, polygons or polyhedra. The graphics information is input into memory and a central processing unit (CPU) interprets instructions and image data in order to perform the appropriate processing. Some computer graphics systems may include special-purpose processors, each custom tailored to specific graphics functions. The main graphical processing function of the CPU (or special-purpose processors) is to simplify very complex models by taking the specifications of graphical primitives specified by application programs and to assign pixels parameter values that best represent characteristics of an image.

In most computer graphic systems an image is represented as a raster (an array) of logical picture elements (pixels). A pixel corresponds to a small area of the image, usually a rectangle (but it can be other shapes). The computer graphics system assigns parameter values to each pixel as part of a rasterization process. Rasterization can proceed on a pixel basis or primitive basis. These parameter values are digital values corresponding to certain attributes of the image (e.g. color, depth, etc.) measured over a small area of the image represented by the pixel. Typically each graphical image is represented by thousands of combined pixels. The pixel parameter values associated with an image are usually stored in a portion of a memory referred to as a frame buffer. The resolution and detail of the image are largely determined by the number of pixels in the frame buffer. The number of bits that are used for each pixel defines the depth of the frame buffer and determines properties such as how many colors can be represented on a given system. For example, a 1-bit-deep frame buffer allows only two colors. Frame buffers play an important role in rasterization.

A frame buffer is a portion of a memory that stores pixel information associated with an image. There are usually a number of frame buffers in a computer graphics system. The frame buffers may be scattered throughout a memory and are not necessarily contiguous. Frame buffers often comprise information associated with a particular image configuration system because some data configuration or reference systems are easier and more efficient for a computer graphics system to manipulate. For example, frame buffers are often configured and allocated memory space in a manner that accommodates a two dimensional "XY" tile coordinate system.

Numerous computer graphics systems prefer to operate in a two dimensional "XY" tile coordinate system. FIG. 1 is a conceptual example of an XY coordinate image configuration system 100. Image configuration system 100 includes 2 by 2 pixel regions, such as pixel region 191, set in 16 by 16 region tiles 170 through 185 arranged on an "x axis" 110, "y axis" 120. Image configuration system 100 includes "z axis" 130. The 2 by 2 pixel regions can be arranged in any place within the texture images and can slide around, sometimes it may fall in a single tile, sometimes it may fall within two tiles and other times it may fall within four tiles. "Slices" of a 3D image are defined by the "z axis", for example pixel region 191 is in slice 133 and pixel region 192 is in slice 134. Slice 134 is actually another xy plane at a different location on the Z axis and pixel region actually lies in tiles (not shown) behind tiles 275, 276, 279 and 280. While a pixel region may move around the coordinate system, the boundaries of the tiles do not change and the tiles are defined by the particular XY coordinates. There are numerous tile boundary configurations, for example a 64 kilo-byte (KB) tile comprising 128 by 128 pixels and each pixel being define by a 32 bit parameter value.

Operating in a tile, XY coordinate system provides certain advantages for most graphics systems and a tile configuration system is particularly beneficial towards the end of a typical graphics pipeline. For example, scan conversion operations can be performed on a number of tiles in parallel permitting much faster scan conversions. Thus, a number of graphics buffers (e.g., image buffer, frame buffer, Z buffer, texture map buffer, etc.) are organized to reference stored data by two-dimensional tiled configuration addresses. While utilizing reference addresses that are configured in accordance with a tile configuration system is efficient for most computer graphics systems, it is not necessarily optimal in all situations.

Memory hardware is usually limited to specific configurations in which the physical location of storage spaces are arranged in a consecutive fashion and are addressed accordingly. Since memory hardware is typically set to a predefined physical location, address references in applications or systems that utilize different configuration schemes are virtual addresses (referencing a "virtual memory") that are translated into addresses that refer to an actual physical storage location. Efficient computer systems usually handle the translations between virtual and physical reference addresses and make the distinction between a physical address that identifies a particular location in memory and a virtual address that identifies or refers to a piece of information transparent to a user.

Differing applications and systems within a computer system often prefer to communicate with memories utilizing reference addresses arranged in particular configurations. Tiled memory addressing is usually not conducive to user processes or applications that formulate memory read and write requests in a linear address format and expect responses in a linear configuration. For example, user graphics processes or applications are typically designed to refer to a contiguous linear virtual address "space" in which each scan line of the graphics buffer is linearly addressable. The addresses are in a virtual configuration since physical addressable space limitations of memory hardware may be smaller than the linear virtual addresses and the information may have to be downloaded to a memory in sections. Again it is preferable for the translations and conversions to be handled automatically and transparent to the user. As discussed above, the objective of most computer graphics systems is to create a graphical image based upon information related to graphics images stored in a memory. Therefore, it is very important for information to be communicated to and from a memory in an efficient manner, including translations or conversions between different virtual address configurations and physical memory addresses.

What is required is a system and method that efficiently maps a linear configuration virtual memory address to a physical memory address via a tile XY coordinate configuration system. The system and method should permit applications that specify virtual memory read and write addresses in a linear configuration to directly access a physical memory address via a system operating in a tile XY coordinate configuration system. The system and method should also facilitate access of tile configuration frame buffers in a physical memory by computer graphics applications that are designed to designate frame buffer addresses in a virtual linear configuration.

SUMMARY OF THE INVENTION

The present invention is a system and method that efficiently converts a linear virtual address to a physical memory address via a tile XY coordinate configuration system. The system and method permits applications that specify read and write addresses in a linear virtual address configuration to directly access a physical memory address via a system operating in a tile XY coordinate configuration system. The system and method of the present invention facilitates access of tile configuration frame buffers in a physical memory by computer graphics applications that are designed to designate frame buffer virtual addresses in a linear configuration.

In one embodiment of the present invention a tile frame buffer linear mapping system facilitates memory accesses utilizing a linear virtual address to designate a physical memory address via a tile XY coordinate configuration system. A linear XY address converter converts a linear address into a tile XY coordinate address. Then a memory storing a descriptor table is utilized to identify an translation buffer base frame offset associated with the particular frame buffer comprising the information to be accessed. Based upon the translation buffer base frame offset forwarded by the descriptor table and a tile identifier, a circuit generates a tile offset into the actual frame buffer. A translation buffer stores a number of physical addresses of locations in a physical memory that store information associated with a base pixel of a graphics tile and determines an index associated with particular graphics tile. Then another circuit the physical memory address of the base pixel of the tile with the tile XY address to determine the physical memory location of information associated with a particular pixel.

BRIEF DESCRIPTION OF THE DRAWINGS

FIG. 2D is a schematic of a descriptor table in one embodiment of the present invention.

FIG. 2E is a schematic of a translation buffer in one embodiment of translation buffer 240.

FIG. 5 is a flow chart of a tile frame buffer linear mapping method, one embodiment of the present invention.

DETAILED DESCRIPTION OF THE INVENTION

Figure 1:
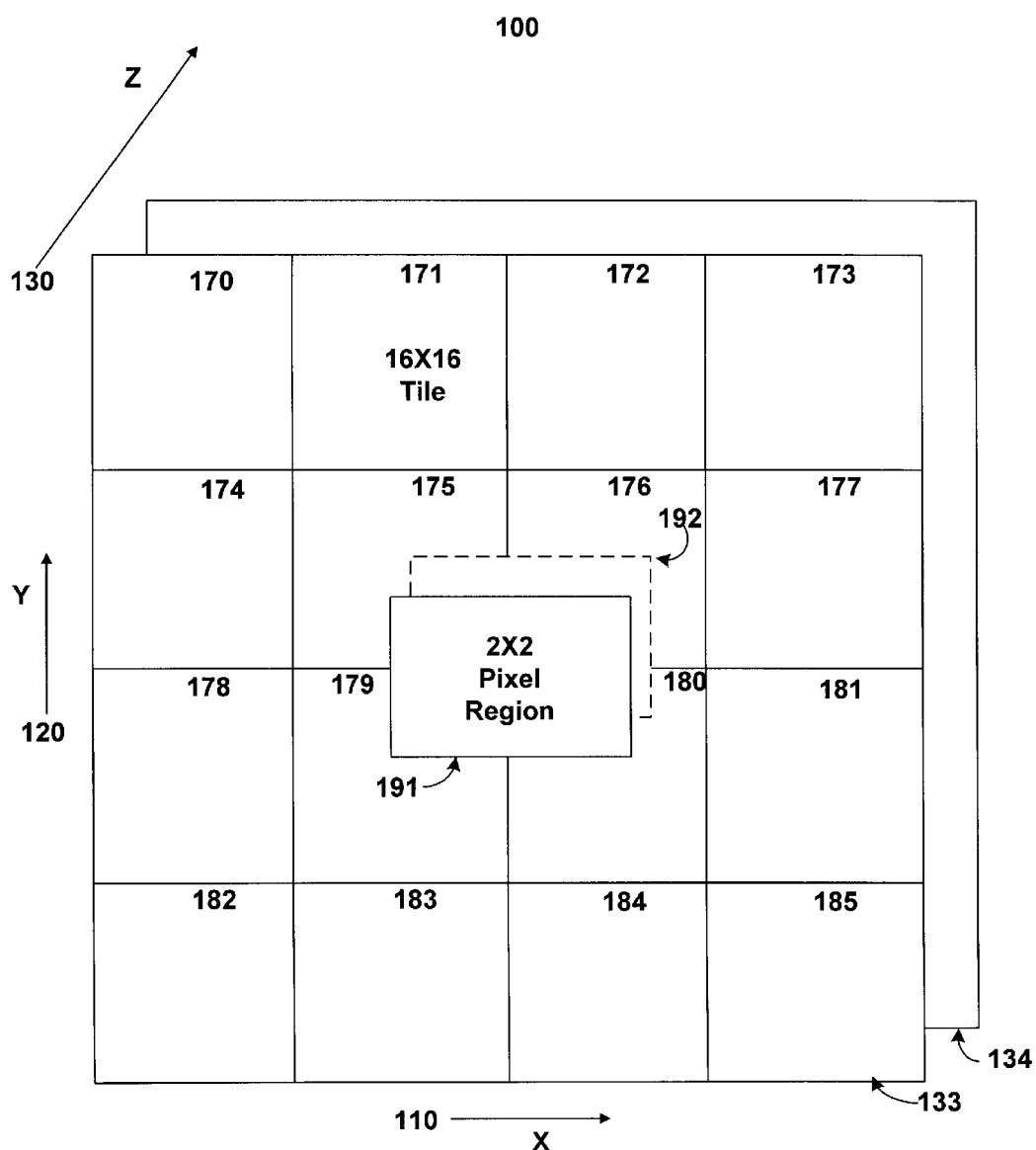
FIG. 1 is a conceptual example of an XY coordinate image configuration system.

Reference will now be made in detail to the preferred embodiments of the invention, a method and system for a direct memory access bridge between two different protocols, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention, may be practiced without these specific details. In other instances; well known methods, procedures, components, and circuits have not been described in detail as not to unnecessarily obscure aspects of the current invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art An procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission or display devices.

The present invention performs mapping functions that permit graphics engines operating in a convenient tile XY coordinate address system to receive information in a linear virtual address configuration and send (or retrieve) the designated information to (or from) a physical memory. A tile frame buffer linear mapping system and method of the present invention facilitates mapping of linear virtual addresses to a physical memory address via a tile XY coordinate configuration system. The system and method of the present invention performs the requisite translations and offset adjustments to execute a physical memory access by user applications that refer to contiguous linear virtual addresses via systems that take advantage of tile XY coordinate configuration systems flexibility.

Figure 2A:
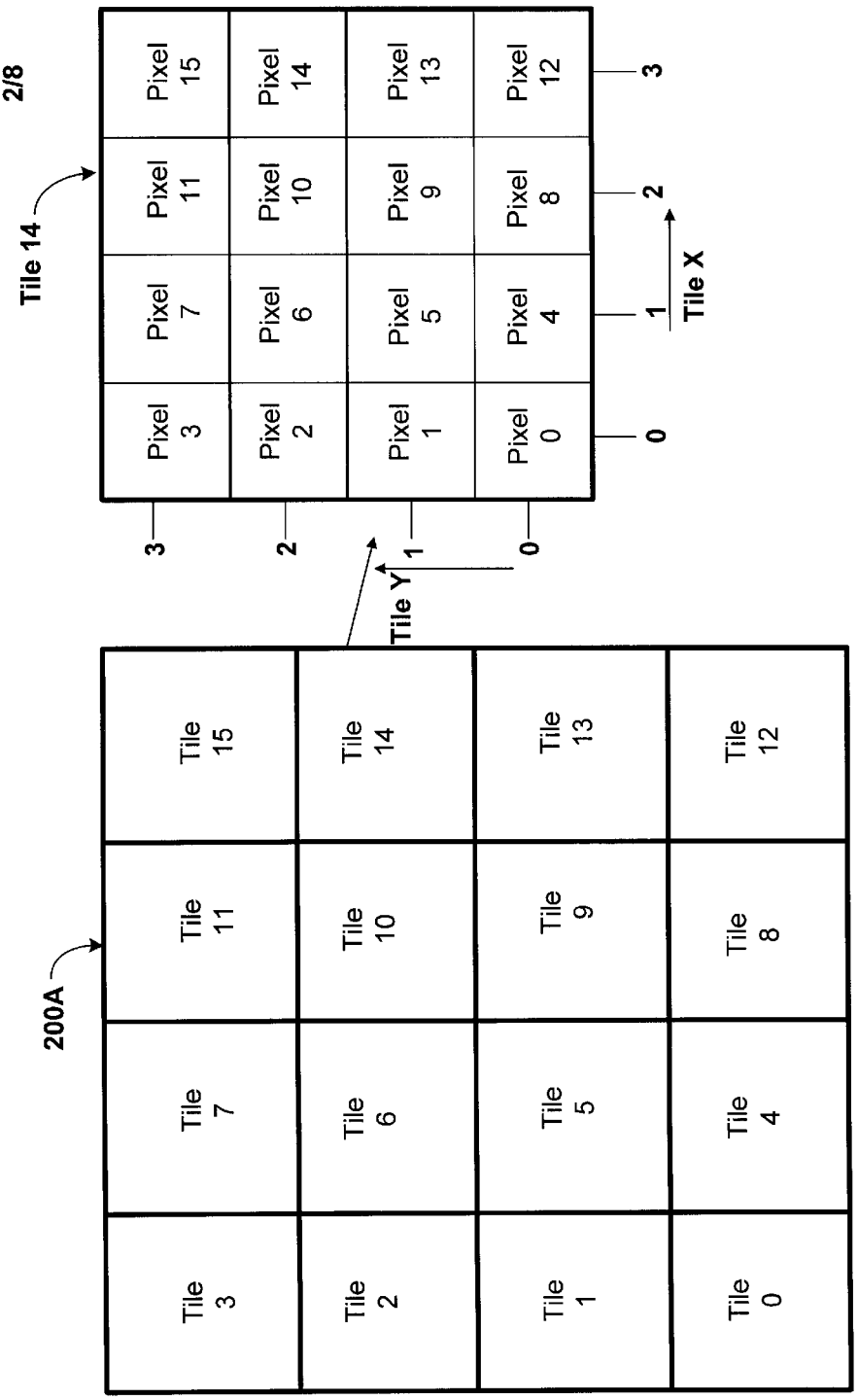
FIG. 2A shows a representation of one embodiment of a frame in the present invention.

FIG. 2A shows a representation of frame 200A, one embodiment of a frame in the present invention. Frame 200A comprises 4 by 4 pixel tiles 0 through tile 15 and each tile comprises 16 pixels. For example, tile 14 comprises pixel 0 through pixel 15. Each pixel in a tile is referenced by a tile XY coordinate address with respect to a tile base pixel that serves as a reference to the intersection of the tile X axis and tile Y axis. For example, the tile base pixel in one embodiment of tile 14 is pixel 0 at tile XY coordinate address (0,0) in the lower left hand corner of tile 4. It should be appreciated that in another embodiment of the present invention the tile base pixel is at a different. location. In one example of tile 14 the tile base pixel is pixel 7 (not shown) with a tile XY coordinate address of (0,0) since it is the location at which the tile x axis and tile y axis intersect.

Figure 2B:
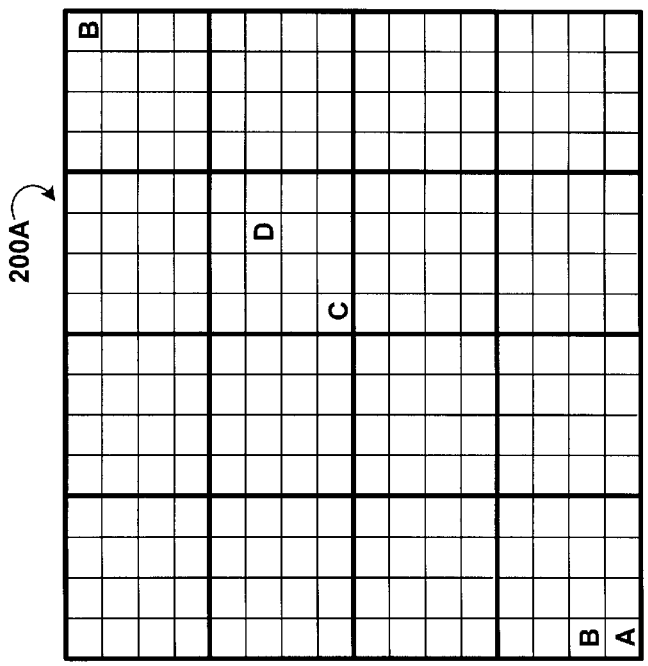
FIG. 2B shows a schematic relationship between a linear virtual address configuration, a tile XY address configuration, and a physical memory address configuration, of the present invention and all referencing or identifying information associated with a pixel in a frame.

FIG. 2B shows a schematic relationship between a linear virtual address configuration, a tile XY address configuration, and a physical memory address configuration, all referencing or identifying information associated with a pixel in frame 200A. Linear virtual address configuration 202 comprises linear virtual addresses 0 to 100,000 of which linear virtual addresses 10,000 through 10,255 are assigned to information associated with a pixel included in frame 200A. Physical memory 203 comprises physical memory addresses 0 through 255. In this embodiment of the present invention, physical memory 203 serves as a frame buffer with exactly enough memory to store parameter value information associated with each pixel in frame 200A. It should be appreciated that physical memory 203 is much larger than a single frame buffer and tiles included in a frame buffer are assigned designated spaces within physical memory 203.

In one embodiment of frame 200A each pixel is defined by one of four parameter values A, B, C, or D. Each of the parameter values comprise 32 bits indicating certain attributes of the image (e.g., color, depth, shading, etc.). For example, linear virtual address 10,000 references information (e.g., pixel parameter value A) associated with the pixel at tile XY coordinate (0,0) of tile 0 and physical memory physical address 0. Linear virtual address 10,001 references information (e.g., pixel parameter value B) associated the pixel at tile XY coordinate (0,1) of tile 0 and physical memory physical address 1. Linear virtual address 10,161 references information (e.g., pixel parameter value C) associated with the pixel at tile XY coordinate (0,0) of tile 10 and physical memory physical address 100. Linear virtual address 10,171 references information (e.g., pixel parameter value D) associated with the pixel at tile XY coordinate (3,3) of tile 10 and physical memory physical address 111.

The present invention performs mapping functions that permit a user application operating in a linear virtual address configuration to directly access a physical memory via a graphics engine operating in a tile XY coordinate system. In one embodiment, the present invention allows a user application to access parameter values associated with frame 200A by a read or write command utilizing linear virtual address configuration 202. For example, the present invention permits a user application to specify a write command that associates a D parameter value to a linear virtual address (e.g., 10,171). In one example, the present invention facilitates the translation of the linear virtual address 10,171 into a physical memory address of physical memory address 171. First the present invention converts the linear virtual address 10,171 into a tile XY coordinate address (3,3) with a tile identifier of 10. The present invention also derives a frame buffer identifier that identifies a frame buffer storing pixel information of frame 200A. Then based upon the frame buffer identification, the tile designation and the tile XY address, the present invention determines a physical memory address storing parameters associated with.

Figure 2C:
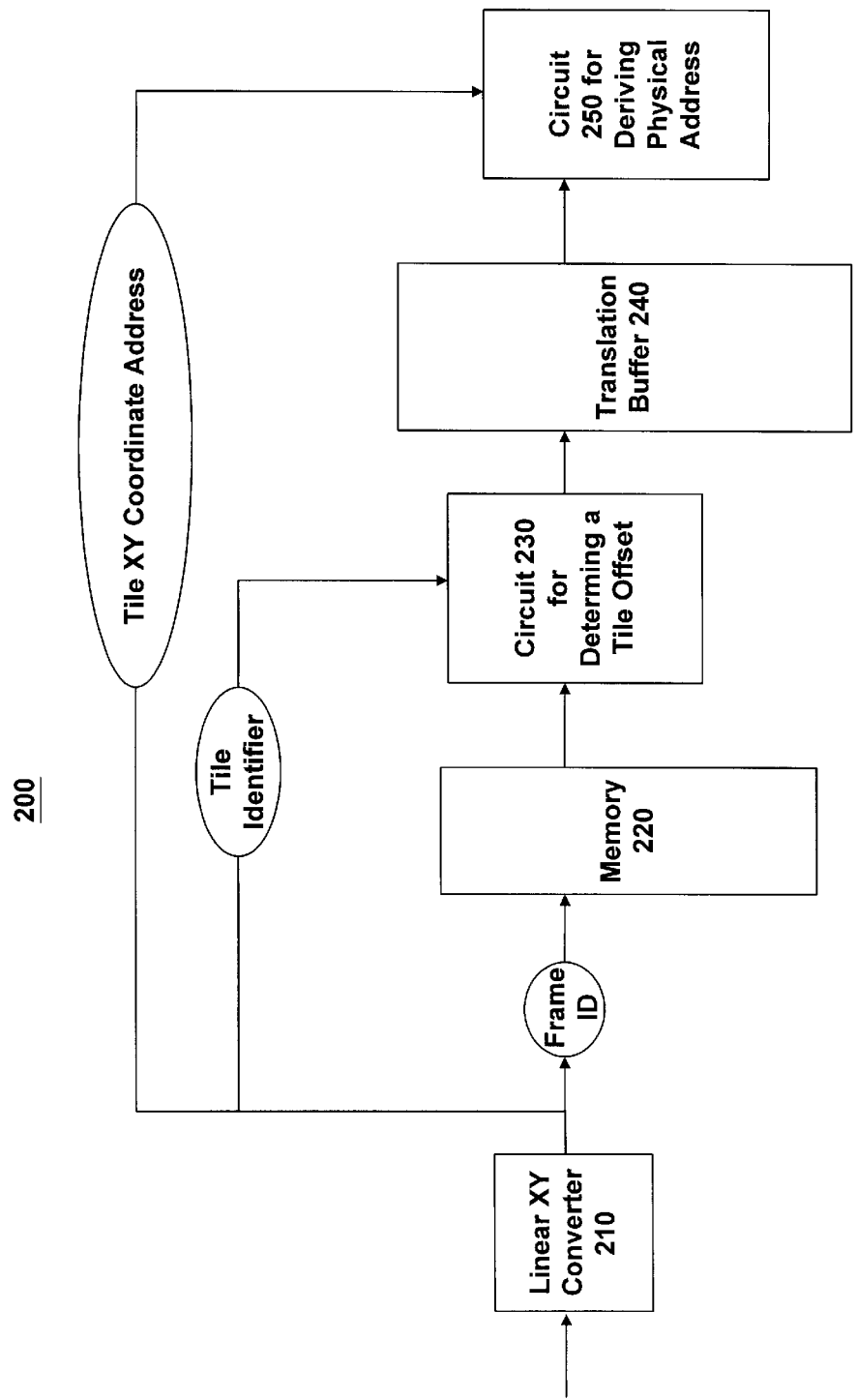
FIG. 2C is a schematic of one embodiment of a tile frame buffer linear mapping system of the present invention.

FIG. 2C is a schematic of tile frame buffer linear mapping system 200, one embodiment of the present invention. Tile frame buffer linear mapping system 200 comprises a linear XY address converter 210, a memory 220, a circuit 230 for determining an offset reference, a translation buffer 240 and a circuit 250 for deriving a physical memory address. Linear XY address converter 210 is coupled to memory 220 and circuit 230 which is coupled to translation buffer 240. Translation buffer 240 is coupled to circuit 250. Memory 200 comprises a descriptor table. FIG. 2D is a schematic of descriptor table 220A, one embodiment of the present invention. Descriptor table 220A comprises a first column 221 that includes a frame buffer identifier and a second column that includes a translation buffer base frame offset. FIG. 2E is a schematic of translation buffer 240A, one embodiment of translation buffer 240. Translation buffer 240A comprises a first column 241 that includes addresses of the translation buffer and a second column that includes addresses physical memory addresses of a storage location comprising information associated with a base pixel of a tile.

The components of tile frame buffer linear mapping system 200 cooperatively function to facilitate memory accesses utilizing a linear virtual address to designate a physical memory address via a tile XY coordinate configuration system. A linear virtual address identifying information associated with a pixel is received by tile frame buffer linear mapping system 200. Linear XY address converter 210 converts a linear virtual address into a tile XY coordinate address and determines a frame buffer identifier and a tile identifier. The frame buffer identifier and tile identifier indicate which frame buffer and tile includes the pixel information to be accessed. Memory 220 stores a descriptor table that is organized to provide a correlation between the frame buffer identifier and an associated translation buffer base frame offset. For example, the frame buffer identifier is a memory 220 address corresponding to a translation buffer base frame offset. The translation buffer base frame offset is an identification of a translation buffer location storing a physical address location that comprises information associated with the base pixel of the base tile of the, frame. Circuit 230 for determining the tile offset reference of the translation, buffer based upon a tile identifier and a translation buffer base frame offset. Translation buffer 240 utilizes the tile offset reference to identify la location within the translation buffer for storing a physical memory address associated with information related to a base reference pixel of a tile. Circuit 250 for deriving a physical memory address of the physical memory location that stores information related to the pixel based upon the tile XY coordinate address and the physical memory address associated with information related to the base reference pixel of the graphics tile.

In one embodiment of the present invention linear XY address converter 210 converts a linear virtual address into a tile XY coordinate address by shifting the linear virtual address to determine a corresponding tile X coordinate or tile Y coordinate. In one example of linear XY address converter 210, a linear virtual address is shifted in accordance with the span width of a tile. The first tile XY address is determined by taking the information referenced by linear virtual address associated with the first pixel in a tile and assigning it an XY coordinate address of (0,0). Then subsequent XY coordinate addresses are determined by shifting the linear virtual address incrementally and assigning a subsequent XY address to the information referenced by the shifted linear virtual address. In one example of the present invention, a first one (e.g., y) of the XY coordinates are incremented for every incrementation of the linear virtual address in a span. The next incrementation is the start of a new span and therefore the first coordinate is reset (e.g., y=0) and the second coordinate (e.g., x) is incremented. Then the first coordinate (e.g., y) is incremented until the beginning of a new span.

Figure 3:
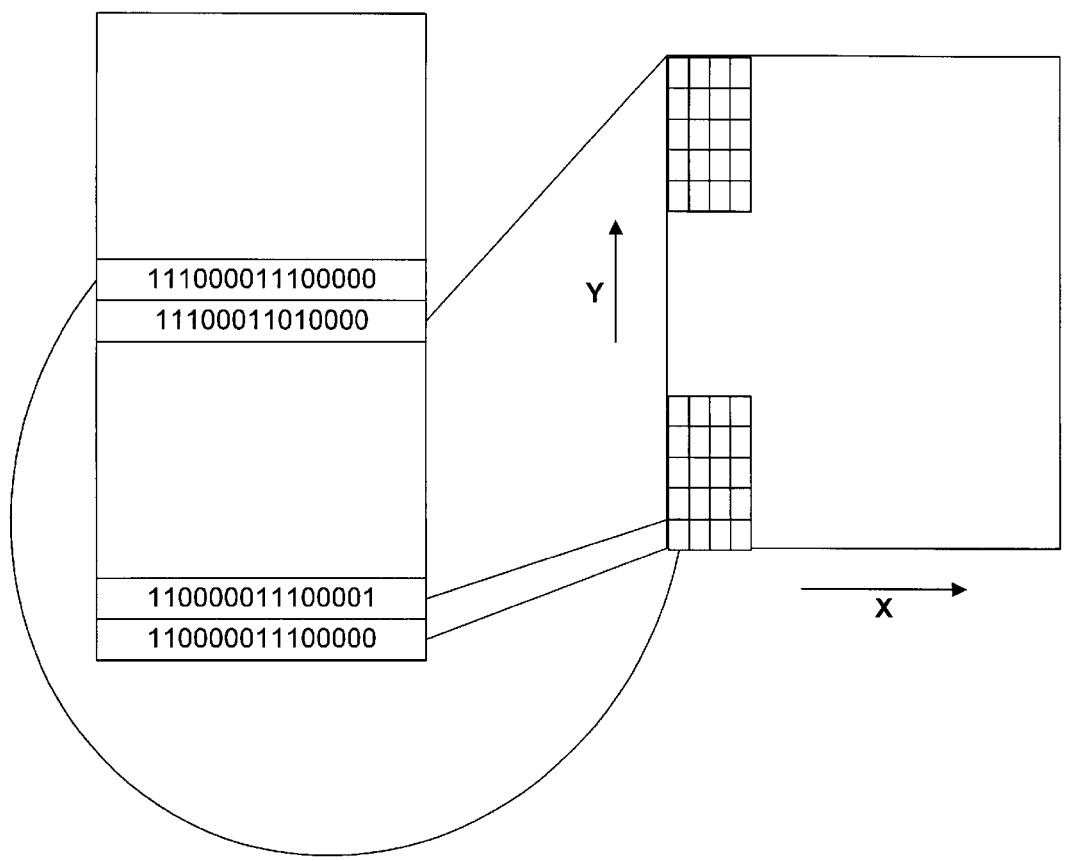
FIG. 3 is an illustration of a tile that is included in one embodiment of the present invention in which tiles are 64 KB with a vertical span of 8 KB.

FIG. 3 is an illustration of tile 300 that is included in one embodiment of the present invention in which tiles are 64 KB with a vertical span of 8 KB (8192 bytes). The lowest 13 bits of the linear virtual address serve as the first X and Y coordinate address of the first pixel in a tile. In one example of the present invention, information associated with the first pixel of tile 300 has a reference linear virtual address 110000011100000 and an XY coordinate address of (0,0). In one example of the present invention one of the XY coordinates are incremented by shifting the linear address. For example, the information associated with the second pixel of tile 300 is referenced by shifting linear virtual address 110000011100000 by 1 to 110000011100001 and assigning the information referenced 110000011100001 to an XY coordinate configuration system address of (0,1). This incrementation of the y coordinate for each incrementation in the linear virtual address continues for an entire span. For example, when linear virtual address 11100011010000 is reached the XY address is (0,8192). Since the next incrementation of the linear virtual address (e.g., 111000011100000) is the start of the next span, the X coordinate is incremented by 1 and the y coordinate is reset to 0. Thus, the XY coordinate of the next span is (1,0) and the incrementation of the linear virtual address continues in which the X coordinate is again held constant for an entire span while the y coordinate is incremented. Once the second span has been converted the x coordinate is incremented and the y coordinate is reset.

In one embodiment of the present invention linear XY address converter 210 also provides a frame buffer identifier (e.g., an identification tag associated with a particular frame buffer) to memory 220 based upon the received linear virtual address. Memory 220 utilizes the identification tag to identify a particular frame buffer comprising the information to be accessed. In one embodiment of the present invention, memory 220 maps the identification tag to a base offset for a buffer frame reference in translation buffer 240. One example of the present invention includes 1 giga-byte (GB) of memory that is allocated, for direct access by user applications into one of 64 frame buffers and memory 220 is organized (e.g., "carved up") to map 64 separate 16 MB frame buffers. In this example the identification tag is determined by the particular 16 mega-byte (MB) region associated with the linear address. In one embodiment of the present invention, circuit 230 generates a tile offset into translation buffer 240 by adding the translation buffer base frame offset from memory 220 to the tile identifier.

A translation buffer 240 is adapted to map a number of graphics tiles and determine a base address associated with a particular graphics tile. In one embodiment of the present invention, the base address is the physical address of information associated with the first pixel in a tile and in another embodiment the base address is the index address of a memory page comprising information associated with the first pixel in a tile. In one embodiment of the present invention multiple frame buffers of varying size are mapped to the translation buffer 240. In one example of the present invention, 16 MB are allocated to each frame buffer and one of the frame buffers is loaded with 2 MB for a particular primitive, thus it will require only a portion of the translation buffer 240. In one embodiment of the present invention, translation buffer component 240 maps a number of graphics tiles and tracks which frame buffer is associated with which graphics tile. The translation buffer component 240 provides a base physical address output of the tile.

Figure 4:
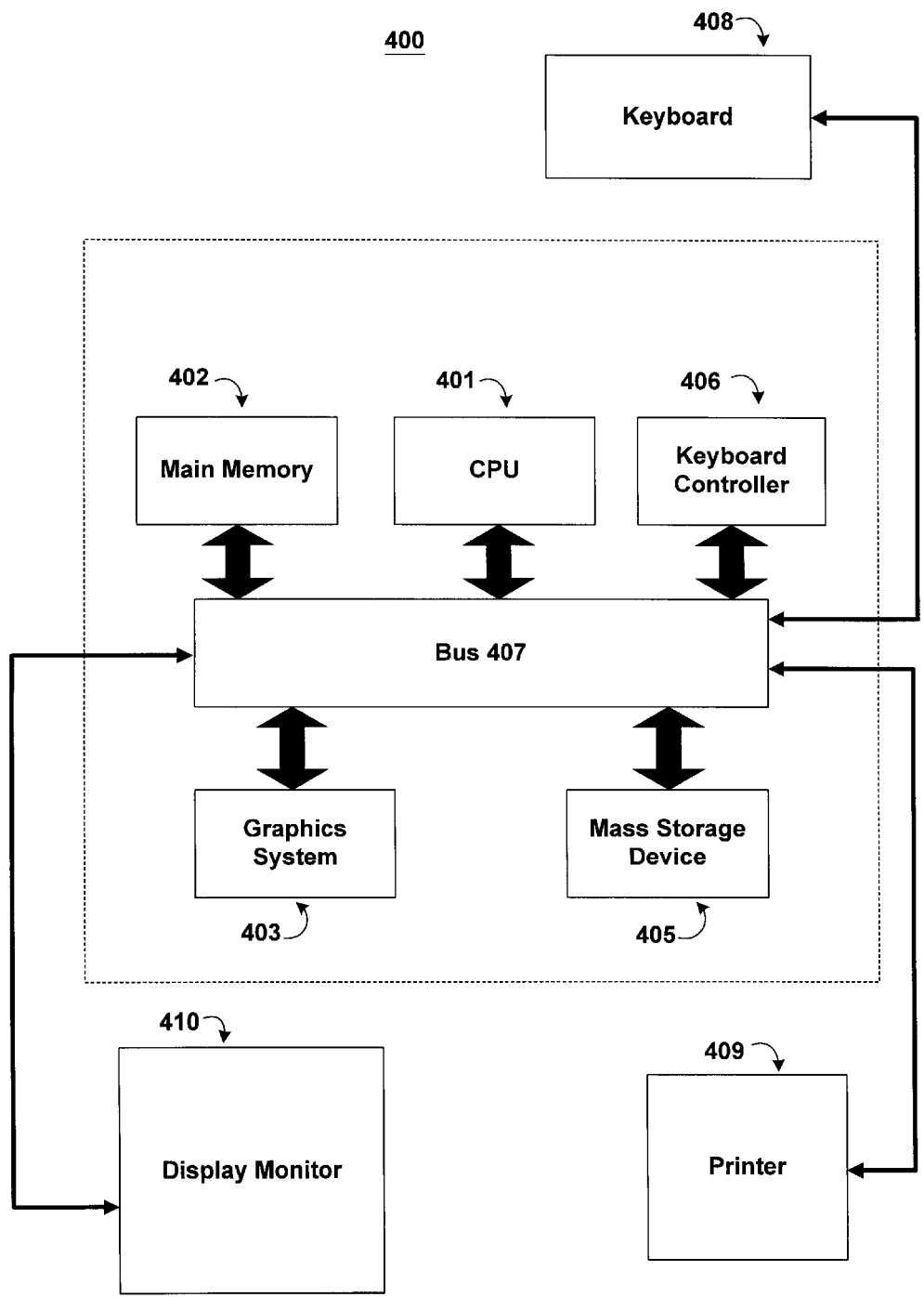
FIG. 4 shows a schematic of one embodiment of a computer graphics system that is capable of facilitating memory accesses utilizing a linear configuration virtual memory address to designate a physical memory address via an XY coordinate configuration graphics system.

FIG. 4 shows a schematic of one embodiment of a computer graphics system 400 that is capable of facilitating memory accesses utilizing a linear configuration virtual address to designate a physical memory address via an XY coordinate configuration graphics system. Computer graphics system 400 comprises a central processing unit (CPU) 401, a main memory 402, graphics controller 403, frame buffer 404, mass storage device 405, keyboard controller 406, keyboard 408, printer 409 and display monitor 410,.all of which are coupled to bus 407. Bus 407 is adapted to communicate information between the components of computer graphics system 400. CPU 401 handles most of the control and data processing. Main memory 402 provides a convenient method of storing data for quick retrieval by CPU 401. Graphics controller 403 processes image data in pipeline stages that addresses information in an XY coordinate configuration system and permits applications that specify read and write addresses in a linear virtual address configurations to directly, access a physical memory address. Frame buffer 404 stores pixel parameter values. Mass storage device 405 stores data associated with multiple images and applications. Keyboard controller 406 controls keyboard 108, which operates as an input device. Printer 409 prints hard copies of graphical images and display monitor 410 displays graphical images.

Computer graphics system 400 comprises a variety of configurations and components in different embodiments. Main memory 402 is a random access memory (RAM) in one embodiment of computer graphics system 400. In one example mass storage device 405 is a magnetic or optical disk and disk for storing information and instructions. In another example of the present invention, display monitor 410 includes a liquid crystal device, cathode ray tube (CRT), or other display device suitable for creating graphic images and alphanumeric characters recognizable to the user. In one embodiment of the present invention, keyboard 108 including alphanumeric and function keys for communicating information and command selections to CPU 401. It is to be appreciated that information and command selection are also directed and/or activated via a cursor directing device (not shown) such as a mouse in one embodiment of the present invention.

Graphics controller 403 includes a graphics engine that operates in a convenient tile XY coordinate address system and receives information in a linear virtual address configuration and sends (or retrieve) the designated information to. (or from) a physical memory. In one embodiment of the present invention, graphics controller 403 utilizes tile frame buffer linear mapping system 200 to performs mapping functions that facilitate mapping of linear virtual addresses to a physical memory address via an XY coordinate configuration system. In one embodiment of the present invention, graphics controller 403 performs the requisite translations and offset adjustments to execute an access of frame buffer 404 by user applications running in CPU 401 that refer to contiguous linear virtual addresses.

FIG. 5 is a flow chart of tile frame buffer linear mapping method 500, one embodiment of the present invention. Tile frame buffer linear mapping method 500 facilitates mapping of linear virtual addresses to a physical memory address via an XY coordinate configuration system. The method of the present invention performs the requisite translations and offset adjustments to execute an appropriate memory access when a use application specifies a read and write addresses in a linear virtual address configuration to directly access a physical memory address via a system operating in a tile XY coordinate configuration system. For example, tile frame buffer linear mapping method 500 facilitates access of tile configuration frame buffers in a physical memory by computer graphics user applications that are designed to designate frame buffer addresses in a linear virtual configuration.

In Step 510 a memory write or read command configured in a linear virtual address configuration system is received. In one embodiment of the present invention, a linear configuration read or write command from a user application is received by a graphics engine.

In Step 520 a linear,virtual address is converted into a tile XY coordinate address. In one embodiment of the present invention, a linear address is converted into az tile XY coordinate address by incrementing the linear address to determine a corresponding tile X coordinate or tile Y coordinate address. In one example of tile frame buffer linear mapping method 500, incrementing includes shifting linear address in accordance with the span width of a tile . In one embodiment of the present invention, the first tile XY address is determined by taking the information referenced by a linear address associated with the first pixel in a tile and assigning it a tile X-Y coordinate address corresponding to the first pixel in a tile. Additional tile XY coordinate addresses are ascertained by shifting the linear address incrementally and assigning a subsequent tile XY address to the information referenced by the shifted linear address. In one example of the present invention, one of the tile XY coordinates are incremented for every incrementation of the linear address in a span and continues for an entire span. Upon the start of a new span the first coordinate is reset and held constant while the second coordinate is incremented until the end of the span.

In Step 530 the tile XY address is translated to a physical memory location address. In one embodiment of the present invention, a particular frame buffer comprising the information to be accessed is identified by an identification tag based upon the received linear virtual address. In one embodiment of the present invention, the identification tag is mapped to a base offset for a buffer frame referenced in a translation buffer (translation buffer 240). In one example of tile frame buffer linear mapping method 500 the tag mapping occurs in a in a memory (e.g., memory 220). An offset to a base tile reference in a translation buffer (e.g., translation buffer 240) is generated. In one embodiment of the present invention, the offset to a base tile reference is generated by adding the translation buffer frame base offset from a memory with the tile XY coordinates. Graphics tiles are then mapped to a base physical address, for example the address location of information associated with the first pixel of a tile.

In one embodiment of the present invention, which frame buffer is associated with which graphics tile is also tracked in step 530. In one embodiment of tile frame buffer linear mapping method 500, the mapping of tiles to physical base tile addresses and the tracking of which frame buffer is associated with which graphics tile is performed by a translation buffer component (e.g., translation buffer component 240). The physical base tile address is added to the tile XY address to determine the physical address of: information associated with a pixel referenced by the tile XY address.

In Step 540 the physical memory location address is transmitted to a memory comprising a frame; buffer. In one embodiment of the present invention, the transmitted physical memory location address is associated with or references information that is the subject of a linear virtual address configuration read or write command from a user application. For example, the transmitted physical memory location address in a frame buffer (e.g., frame buffer 404) comprises information that is the subject of a linear configuration read or write command from a user application running in a CPU (e.g., CPU 401). In one embodiment of the present invention, the information that is the subject of the linear virtual address configuration read or write command is processed by a graphics controller and a CPU (e.g., CPU 401 and graphics controller 403) and utilized to produce an image via a printer and monitor (e.g., printer 409 and display monitor 410).

Thus, the present invention is a system and method that efficiently maps a linear virtual address to a physical memory address via an XY coordinate configuration system. The system and method of the present invention permits applications that specify read and write addresses in a linear virtual address configuration to directly access a physical memory address via a system operating in an XY coordinate configuration system. The system and method of the present invention also facilitates access of tile configuration frame buffers in a physical memory by computer graphics applications that are designed to designate frame buffer addresses in a linear virtual address configuration.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A tile frame buffer linear mapping method comprising the steps of:
    receiving a memory write or read command configured in a linear virtual address configuration system;
    converting a linear virtual address into a tile XY coordinate address, wherein the tile XY coordinate address comprises an X coordinate, a Y coordinate, and a tile identifier;
    assigning information referenced by the linear virtual address associated with the first pixel in a tile to an XY coordinate address of corresponding to the first pixel in a tile;
    ascertaining additional XY coordinate addresses by shifting said linear virtual address incrementally and assigning a subsequent XY address to the information referenced by the shifted linear virtual address;
    resetting a second coordinate of an XY coordinate address upon the start of a new span;
    incrementing a first coordinate of an XY coordinate address upon said start of said new span;
    translating said tile XY coordinate address to a physical memory location address; and
    transmitting said physical memory location address to a memory comprising a frame buffer.

2. The tile frame buffer linear mapping method of claim 1 further comprising the step of incrementing said linear virtual address to determine a corresponding tile X coordinate or tile Y coordinate address.

3. The tile frame buffer linear mapping method of claim 1 further comprising the step of shifting said linear virtual address in accordance with a span width of a tile.

4. The tile frame buffer linear mapping method of claim 1 further comprising the steps of:
    identifying a particular frame buffer of a plurality of frame buffers, the particular frame buffer comprising the information to be accessed by an identification tag based upon a received linear virtual address;
    mapping said identification tag to a base offset for a buffer frame reference in a translation buffer component;
    generating an offset to a base tile reference in a translation buffer; and
    mapping graphics tiles to a base physical address.

5. The tile frame buffer linear mapping method of claim 1 further comprising the step of tracking which frame buffer is associated with which graphics tile.

6. The tile frame buffer linear mapping method of claim 1 further comprising the step of determining the physical address of information associated with a pixel referenced by a tile XY address by adding a physical base tile address to a tile XY address.

7. The method of claim 1 wherein the tile XY coordinate address comprises an X coordinate, a Y coordinate, and a tile identifier, and the tile identifier comprises a single value.

8. In a computer system, a tile frame buffer linear mapping system comprising:
    a translation buffer that utilizes a tile offset reference to identify a location within said translation buffer for storing a physical memory address associated with information related to a base reference pixel of a graphics tile;
    a circuit for determining said tile offset reference of said translation buffer based upon a tile identifier and a translation buffer base frame offset, said circuit for determining said tile offset reference coupled to said translation buffer;
    a memory for storing a descriptor table that is organized to provide a correlation between a frame buffer identifier and said frame buffer offset, said memory coupled to said circuit for determining said offset reference;
    a linear XY address converter which converts a linear virtual address into a tile XY coordinate address and determines said frame buffer identifier and said tile identifier; said linear XY address converter coupled to said memory for storing a descriptor table; and
    a circuit for deriving a physical memory address of a physical memory location that stores information related to a pixel based upon said tile XY coordinate address and said physical memory address associated with information related to said base reference pixel of said graphics tile.

9. The tile frame buffer linear mapping system of claim 8 wherein said linear XY address converter converts said linear virtual address into a tile XY coordinate address by shifting said linear virtual address to determine a corresponding tile X coordinate or tile Y coordinate address.

10. The tile frame buffer linear mapping system of claim 9 wherein said linear virtual address is shifted in accordance with a span width of a tile.

11. The tile frame buffer linear mapping system of claim 9 wherein a first tile XY coordinate address is determined by taking the information referenced by said linear virtual address associated with the first pixel in a tile and assigning it a tile XY coordinate address of (0,0).

12. The tile frame buffer linear mapping system of claim 8 wherein said tile XY coordinate address is determined by shifting said linear address incrementally and assigning a subsequent XY address to the information referenced by a resulting shifted linear address.

13. The tile frame buffer linear mapping system of claim 8 wherein said tile XY coordinate address is determined by incrementing a first coordinate of the XY coordinates for every incrementation of said linear virtual address in a span and resetting said first coordinate upon the start of a new span and incrementing a second coordinate of said XY coordinate address.

14. The tile frame buffer linear mapping system of claim 8 in which said linear XY address converter also provides an identification tag associated with a particular frame buffer to said descriptor table component based upon said received linear virtual memory address and said descriptor table component utilizes said identification tag to identify said particular frame buffer comprising information to be accessed.

15. The tile frame buffer linear mapping system of claim 8 in which said memory maps a frame buffer identification tag to a tile base offset for a buffer frame reference in said translation buffer.

16. The tile frame buffer linear mapping system of claim 8 in which said circuit for determining said tile offset reference of said translation buffer generates said tile offset reference by adding a translation buffer base frame offset to said tile identifier.

17. The tile frame buffer linear mapping system of claim 8 in which said translation buffer component is further adapted to map a number of graphics tiles and determine a physical address storing information associated with base pixel of a tile.

18. A computer graphics system that is capable of facilitating memory accesses utilizing a linear configuration virtual memory address to designate a physical memory address via a tile XY coordinate configuration graphics system, comprising:

a bus adapted to communicate information between components of said computer graphics system;

a central processing unit (CPIJ) coupled to said bus, said CPU adapted to provide control and data processing;

a main memory coupled to said bus, said main memory adapted to provide a convenient method of storing data for quick retrieval by said CPU;

a graphics controller coupled to said bus, said graphics controller adapted to process image data in pipelined stages that addresses information in said tile XY coordinate configuration system and permits applications that specify read and write addresses in a linear virtual address configuration to directly access a physical memory address , wherein said tile XY coordinate configuration system addresses data with an X coordinate, a Y coordinate, and a tile identifier;

a translation buffer that utilizes a tile offset reference to identify a location within said translation buffer for storing a physical memory address associated with information related to a base reference pixel of a graphics tile;

a circuit for determining said tile offset reference of said translation buffer based upon a tile identifier and a translation buffer base frame offset, said circuit for determining said tile offset reference coupled to said translation buffer;

a memory for storing a descriptor table that is organized to provide a correlation between a frame buffer identifier and said frame buffer offset, said memory coupled to said circuit for determining said offset reference;

a linear XY address converter which converts a linear virtual address into a tile XY coordinate address and determines said frame buffer identifier and said tile identifier; said linear XY address converter coupled to said memory for storing a descriptor table;

a circuit for deriving a physical memory address of a physical memory location that stores information related to a pixel based upon said tile XY coordinate address and said physical memory address associated with information related to said base reference pixel of said graphics tile; and a frame buffer coupled to said bus, said frame buffer adapted to store pixel parameter values.

19. The computer graphics system of claim 18 that is capable of facilitating memory accesses utilizing a linear configuration virtual memory address to designate a physical memory address via an XN coordinate configuration graphics system, further comprising:

a mass storage device coupled to said bus, said mass storage device adapted to store data associated with multiple images and applications;

a keyboard coupled to said bus, said keyboard adapted to operate as an input device;

a keyboard controller coupled to said bus, said keyboard adapted to control said keyboard; and a monitor coupled to said bus, said monitor adapted to display graphical images.

20. The computer graphics system of claim 18 that is capable of facilitating memory accesses utilizing a linear configuration virtual memory address to designate a physical memory address via an XY coordinate configuration graphics system, wherein said graphics controller further comprises a graphics engine that operates in a convenient tile XY coordinate address system and receives information in a linear virtual address configuration and sends and retrieves the designated information to and from a physical memory.

21. The computer graphics system of claim 18 that is capable of facilitating memory accesses utilizing a linear configuration virtual memory address to designate a physical memory address via an XY coordinate configuration graphics system, wherein said graphics controller performs the requisite translations and offset adjustments to execute an access of said frame buffer by user applications running in said CPU that refers to contiguous virtual memory addresses.

22. The computer graphics system of claim 18 wherein the tile XY coordinate address comprises an X coordinate, a Y coordinate, and a tile identifier, and the tile identifier comprises a single value.

* * * * *